Figure 1:
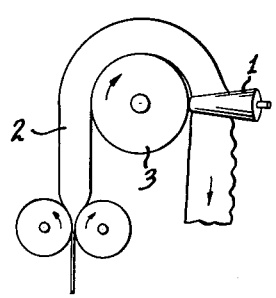

United States Patent Office 3,155,752
Patented Nov. 3, 1964

3,155,752
METHOD AND APPARATUS FOR SHAPING
SAUSAGE CASINGS
Ernst Riegler, Niederwalluf, Rheingau, Germany, assignor to Kalle Aktiengesellschaft, Wiesbaden-Biebrich, Germany
Filed Oct. 3, 1962, Ser. No. 228,178
Claims priority, application Germany Oct. 5, 1961
5 Claims. (Cl. 264—95)

This invention relates to a method and apparatus for shaping sausage casings, more especially for producing casings for sausage rings, and is an improvement in a known process and apparatus of the type disclosed, for example, in U.S. Patent Number 2,925,621.

This known process for the manufacture of regenerated cellulose casings for sausage rings includes the steps of filling tubes, obtained by coagulating viscose solutions, with gas, winding them, while still in a deformable state, around a cylindrical or substantially cylindrical support, and converting such wound tubes into cellulose material that is difficult or impossible to deform. In carrying out this process in a continuous manner, the support around which the tube is wound is a rotatable, substantially cylindrical roll or reel. In the known process, the tube is wound in several coils around the reel and reels are preferred which are also capable of transporting the wound tubular material laterally, since without such lateral transport the winding and unwinding of the tubular material can not, in this case, be effected continuously. A pair of cylindrical nip rolls are located a short distance from the reel, through which rolls the tube passes after leaving the reel, so that a closure for the gas filling is formed. In most cases, a second pair of cylindrical nip rolls are employed through which the tube is supplied to the reel and the gas contained in the tubular material is sealed off; however, this second pair of nip rolls may be dispensed with when, for example, the tube coming off the extrusion nozzle, by which it is formed, is immediately wound on the reel and the gas pressure required for filling the tubular material is maintained by means of a gas duct passing through the nozzle.

The type of apparatus described above has the disadvantage that the pair of nip rolls, through which the tubular casing is withdrawn from the reel, distort the tube so that the short inside arc of the tubular ring is distended, whereby the final product loses its shape again almost completely.

The present invention provides an apparatus for shaping sausage casings, including a reel over which a gas-filled tubular casing may be passed, means for supplying the gas-filled casing to the reel and a pair of conical nip rolls for receiving the casing after passage thereof over the reel, the rolls being arranged adjacent the surface of the reel with their rotational axes substantially disposed in a plane passing through the rotational axis of the reel. Preferably, the rotational axes of the nip rolls are arranged so that they converge towards a point on the rotational axis of the reel. Advantageously, the reel is so constructed and/or arranged that a tubular casing may be coiled thereon and moved in a direction parallel to the rotational axis thereof while passing over the reel, the conical rolls being disposed with the line of nip between them at an angle to the rotational axis of the reel which corresponds to the pitch angle of a tubular casing so coiled. The taper of the conical rolls may vary within wide limits. It has been found advantageous to use rolls having a taper angle ranging from 10 to 20°, and an angle of 15° has been found to provide good results.

Figure 2:
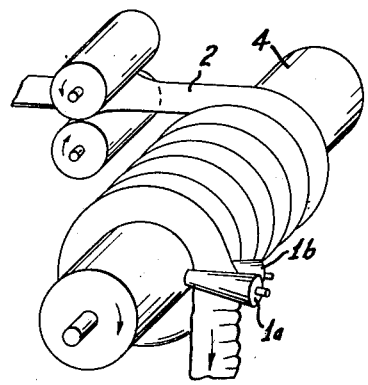
Figure 4:
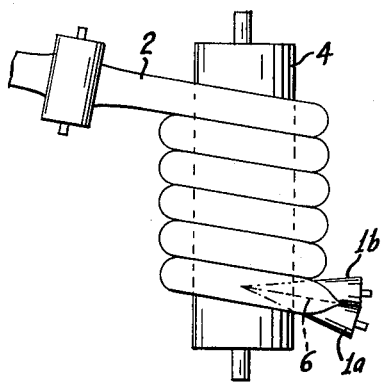
Figure 3:
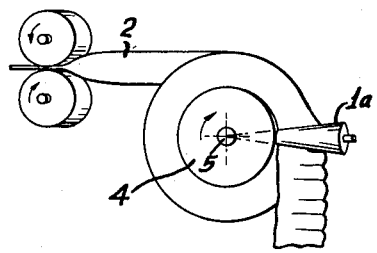
Figure 6:
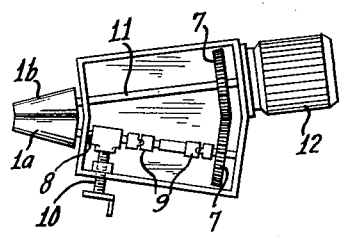
Figure 5:
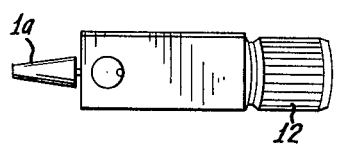

The invention is further illustrated in the accompanying drawings in which:

FIGURE 1 is an end view in elevation of one embodiment of the invention,
FIGURE 2 is a perspective view of a different embodiment of the invention,
FIGURE 3 is an end view in elevation of the embodiment of FIGURE 2,
FIGURE 4 is a plan view of the embodiment of FIGURE 2,
FIGURE 5 is a side view in elevation of a detail of one embodiment of the invention, and
FIGURE 6 is a plan view of the device of FIGURE 5.

Referring to the drawings, the apparatus of FIGURE 1 operates with less than a complete turn of tubular material 2 on the reel. In such a case, it suffices to use a reel in the shape of an ordinary roll 3 cooperating with a pair of conical nip rolls which are disposed adjacent the roll 3 and in what may be freely termed a radial relation thereto. As shown in FIGURES 2, 3 and 4, the tubular material 2 is wound in several coils around a reel 4. In this case, the reel 4 is also adapted for lateral transport of the tubular material, by means not shown. Reels which, when tubular material is wound upon them, are also capable of lateral transport have been described, for example, in U.S. Patent Numbers 2,925,621 and 2,963,233.

As shown in FIGURE 3, the central axes of the pair of conical nip rolls 1 are in a plane passing through the rotational axis of the reel 4. Furthermore, the extended central axes of the two nip rolls 1a and 1b are shown to meet at a point on the reel axis 5. This advantageous arrangement can in actual practice usually be achieved only approximately, but as close an approximation as possible should be made.

FIGURE 4 shows the most practical arrangement of the pair of conical squeeze rolls. In this case, the nip 6 of the rolls 1a and 1b is parallel to a projection of the pitch line, i.e., at an angle to the reel axis which is equal to $90°-\beta$, $\beta$ being the pitch angle of the coils of tubular material.

The two conical nip rolls 1a and 1b are advantageously supported by bearings at one end only and they should preferably have a common positive drive. In addition, the distance between them should be variable. FIGURES 5 and 6 show a construction of a pair of nip rolls which satisfies these conditions. FIGURE 5 shows a pair of nip rolls with their drive gear casing in a side view while FIGURE 6 is a plan view of the casing with the top removed. The drive of the pair of conical nip rolls 1a and 1b is transmitted by the bevel gear 7. The indirectly driven conical roll 1a can be separated from the directly driven conical roller 1b even when the rolls 1a and 1b are revolving. For this purpose, there are shown provided on the spindle 8 of the roll 1a two universal joints 9 and a connecting linkage for a screw spindle 10 which latter enables the spindle 8 to be laterally displaced in a manner such as to remove the roll 1a from contact with the roll 1b, the universal joints 9 enabling this movement to occur. The drive for the directly driven conical roll 1b is by an electric motor 12.

It will be obvious to those skilled in the art that many modifications may be made within the scope of the present invention without departing from the spirit thereof, and the invention includes all such modifications.

What is claimed is:

1. An apparatus for continuously shaping tubes adapted for use as sausage casings comprising a reel adapted to have a gas-filled tube wound thereon, means for supplying a tube to the reel and a pair of conical nip rolls for removing the tube from the reel, the latter being mounted adjacent the reel with the axes of rotation thereof being substantially in the same plane as the axis of rotation of the reel.

2. An apparatus for continuously shaping tubes adapted for use as sausage casings comprising a reel adapted to have a gas-filled tube wound thereon, means for supplying a tube to the reel and a pair of conical nip rolls for removing the tube from the reel, the latter being mounted adjacent the reel with the axes of rotation thereof being substantially in the same plane as the axis of rotation of the reel and the axes of rotation of the nip rolls converging toward a point on the axis of rotation of the reel.

3. An apparatus according to claim 1 in which the nip line between the conical nip rolls is at the same angle to the axis of rotation of the reel as the pitch angle of the tube.

4. An apparatus according to claim 1 in which the taper angle of the conical nip rolls is in the range of about 10 to 20°.

5. A method for continuously shaping tubes adapted for use as sausage casings which comprises winding a gas-filled tube onto the surface of a rotating cylindrical holder, imparting a permanent set to the tube, and removing the tube from the holder through a nip zone having a nip line disposed at the same angle to the axis of rotation of the holder as the pitch angle of the tube.

References Cited in the file of this patent

UNITED STATES PATENTS 2,925,621    Parth _____ Feb. 23, 1960